United States Patent
Oddo et al.

(10) Patent No.: US 10,296,862 B1
(45) Date of Patent: May 21, 2019

(54) TIME INTERVAL ASSESSMENT OF MISSION PLAN QUALITY DYNAMIC ASSET ALLOCATION

(71) Applicants: Louis Oddo, Carlsbad, CA (US); Devang R. Parekh, San Diego, CA (US); William Parsons, Valley Center, CA (US); Henry H. Fung, San Diego, CA (US); Feng Cao, San Diego, CA (US); Miteshkumar K. Patel, San Marcos, CA (US)

(72) Inventors: Louis Oddo, Carlsbad, CA (US); Devang R. Parekh, San Diego, CA (US); William Parsons, Valley Center, CA (US); Henry H. Fung, San Diego, CA (US); Feng Cao, San Diego, CA (US); Miteshkumar K. Patel, San Marcos, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 408 days.

(21) Appl. No.: 15/152,666

(22) Filed: May 12, 2016

(51) Int. Cl.
- G06Q 10/06 (2012.01)
- G06F 3/0484 (2013.01)
- G06F 16/2457 (2019.01)

(52) U.S. Cl.
CPC ..... *G06Q 10/06395* (2013.01); *G06F 3/0484* (2013.01); *G06F 16/24578* (2019.01); *G06Q 10/063114* (2013.01)

(58) Field of Classification Search
CPC ............. G06Q 10/06; G06Q 10/06395; G06Q 10/063114; G06F 3/0484; G06F 17/3053
See application file for complete search history.

(56) References Cited

U.S. PATENT DOCUMENTS

| | | | |
|---|---|---|---|
| 6,122,572 A | 9/2000 | Yavnai | |
| 7,693,653 B2 | 4/2010 | Hussain et al. | |
| 8,628,392 B1* | 1/2014 | Kong | G09B 19/00 463/43 |
| 8,909,950 B1* | 12/2014 | Levchuk | H04W 52/223 713/300 |
| 9,188,982 B2* | 11/2015 | Thomson | G05D 1/0274 |
| 9,567,077 B2* | 2/2017 | Mullan | G05D 1/104 |
| 9,922,282 B2* | 3/2018 | Weller | G06F 11/00 |
| 2006/0217993 A1* | 9/2006 | Anderson | G06Q 10/10 701/29.3 |

(Continued)

*Primary Examiner* — Dylan C White
(74) *Attorney, Agent, or Firm* — Tarolli, Sundheim, Covell & Tummino LLP

(57) ABSTRACT

A method includes processing one or more mission plan inputs to generate a mission definition file (MDF) that includes mission data that describes one or more plans for one or more manned or unmanned vehicles. The method includes evaluating planned tasks against defined scoring criteria specific to each task type and specific to each task to generate individual task achievement quality scores for each of the planned mission tasks. The method includes processing the MDF, the individual task quality scores, and route costs to generate a mission plan to enable evaluation and comparison of one or more mission plans. The method includes generating graphical output data from the output quality scores where the graphical output data can be configured as a mission plan evaluation chart.

15 Claims, 6 Drawing Sheets

(56) References Cited

U.S. PATENT DOCUMENTS

| | | | |
|---|---|---|---|
| 2007/0032920 A1* | 2/2007 | Dapp | G01C 21/12 701/3 |
| 2007/0113235 A1* | 5/2007 | De | G06Q 10/06 719/313 |
| 2009/0113427 A1 | 4/2009 | Brady et al. | |
| 2009/0125225 A1* | 5/2009 | Hussain | G01C 21/20 701/416 |
| 2010/0145552 A1* | 6/2010 | Herman | G08G 5/0034 701/3 |
| 2011/0098914 A1* | 4/2011 | Milbert | G01C 21/20 701/532 |
| 2011/0246551 A1* | 10/2011 | Giancaspro | G05B 15/02 709/202 |
| 2011/0283285 A1* | 11/2011 | Saad | G06Q 10/0631 718/102 |
| 2014/0058786 A1* | 2/2014 | Marquet | G06Q 10/06316 705/7.26 |
| 2014/0142785 A1* | 5/2014 | Fuentes | G05D 1/0011 701/2 |
| 2014/0257760 A1* | 9/2014 | Nixon | G06Q 10/06 703/1 |
| 2015/0356875 A1* | 12/2015 | Sane | G08G 5/0047 701/408 |
| 2017/0146991 A1* | 5/2017 | Parekh | B64D 45/00 |
| 2018/0157255 A1* | 6/2018 | Halverson | B64C 39/024 |

\* cited by examiner

TIME INTERVAL ASSESSMENT OF MISSION PLAN QUALITY DYNAMIC ASSET ALLOCATION

TECHNICAL FIELD

This disclosure relates to manned and unmanned vehicle interfaces, and more particularly to a system and method to dynamically evaluate mission plans for manned and unmanned vehicles over selected current or future time periods.

BACKGROUND

Typical mission plan interface software for a general manned or unmanned vehicle allows operators to plan the tasks to be executed by each vehicle via a graphical user interface that includes various input and output options for feedback and control of the planning process. The graphical user interface of existing methods typically provides a three-dimensional presentation that includes latitude, longitude, and altitude information in the display output relating to a proposed mission plan. Typical graphical user interfaces to existing mission planning and control systems have limited abilities to view and compare two plans for a single vehicle. This usually consists of limited abilities to visually compare the current iteration of a single plan for a single vehicle with the previous iteration of the same plan. Comparison is typically performed visually by a human operator comparing the route and each individual task within the mission plan against defined mission success criteria. Some methods attempt to provide computational metrics that quantify the performance of one or more aspects of the mission plan. These current methods are slow and manually cumbersome at evaluating the mission plan's performance for a single vehicle and are generally incapable of handling multiple plan alternatives for multiple vehicles. Current methods are also typically tied to a single mission planner designed for a single specific vehicle further restricting their ability to evaluate alternatives for other vehicles of the same domain type or other vehicles of different domain types.

SUMMARY

This disclosure relates to a system and method to dynamically evaluate mission plans for both manned and unmanned vehicles over selected current or future time periods. In one aspect, a system includes a memory to store computer-executable components and a processor to execute the computer-executable components from the memory. The computer-executable components include at least one mission planner that processes one or more mission plan inputs and generates a mission definition file (MDF) that includes mission data that describes one or more mission plans for one or more manned or unmanned vehicles. A task achievement evaluator evaluates task criteria to generate individual task quality scores for each of the mission plan input tasks processed by the mission planner. The task quality scores represent an expectation of how the planned task is to be executed. A mission plan constructor processes the MDF from the mission planner and the task quality scores from the task achievement evaluator to generate a plan score for one or more annotated mission plans. A plan comparator processes the one or more annotated mission plans. The plan comparator generates graphical output data from the output quality scores generated by the task achievement evaluator. The graphical output data is configured as a mission plan evaluation chart that provides the plan score generated by the mission plan constructor.

In another aspect, a non-transitory computer readable medium having computer executable components stored thereon is provided. The computer executable components include at least one mission planner that processes one or more mission plan inputs and generates a mission definition file (MDF) that includes mission data that describes one or more mission plans for one or more manned or unmanned vehicles. A task achievement evaluator having at least one evaluation engine evaluates task criteria to generate individual task quality scores for each of the mission plan input tasks processed by the mission planner. The task quality scores represent an expectation of how the planned task is to be executed. A mission plan constructor processes the MDF from the mission planner and the task quality scores from the task achievement evaluator to generate a plan score for one or more annotated mission plans. A plan comparator processes the one or more annotated mission plans. The plan comparator generates graphical output data from the output quality scores generated by the task achievement evaluator. The graphical output data is configured as a mission plan evaluation chart that provides the plan score generated by the mission plan constructor. The plan comparator includes a spatial temporal forecaster to project planned mission states to a specified future point in time and a human machine interface (HMI) for visualizing mission plans and projected future states of the mission plans.

In yet another aspect, a method includes processing one or more mission plan inputs. The method includes evaluating payload criteria to generate resource quality scores for each of the processed mission plan inputs. The method includes processing a mission definition file and the resource quality scores to generate output quality scores related to the quality of one or more mission plans. The method includes generating graphical output data from the output quality scores. The method includes generating a behavior and a duration display output to indicate when a loaded route from the mission plans and associated resources are active.

DETAILED DESCRIPTION

Figure 1:
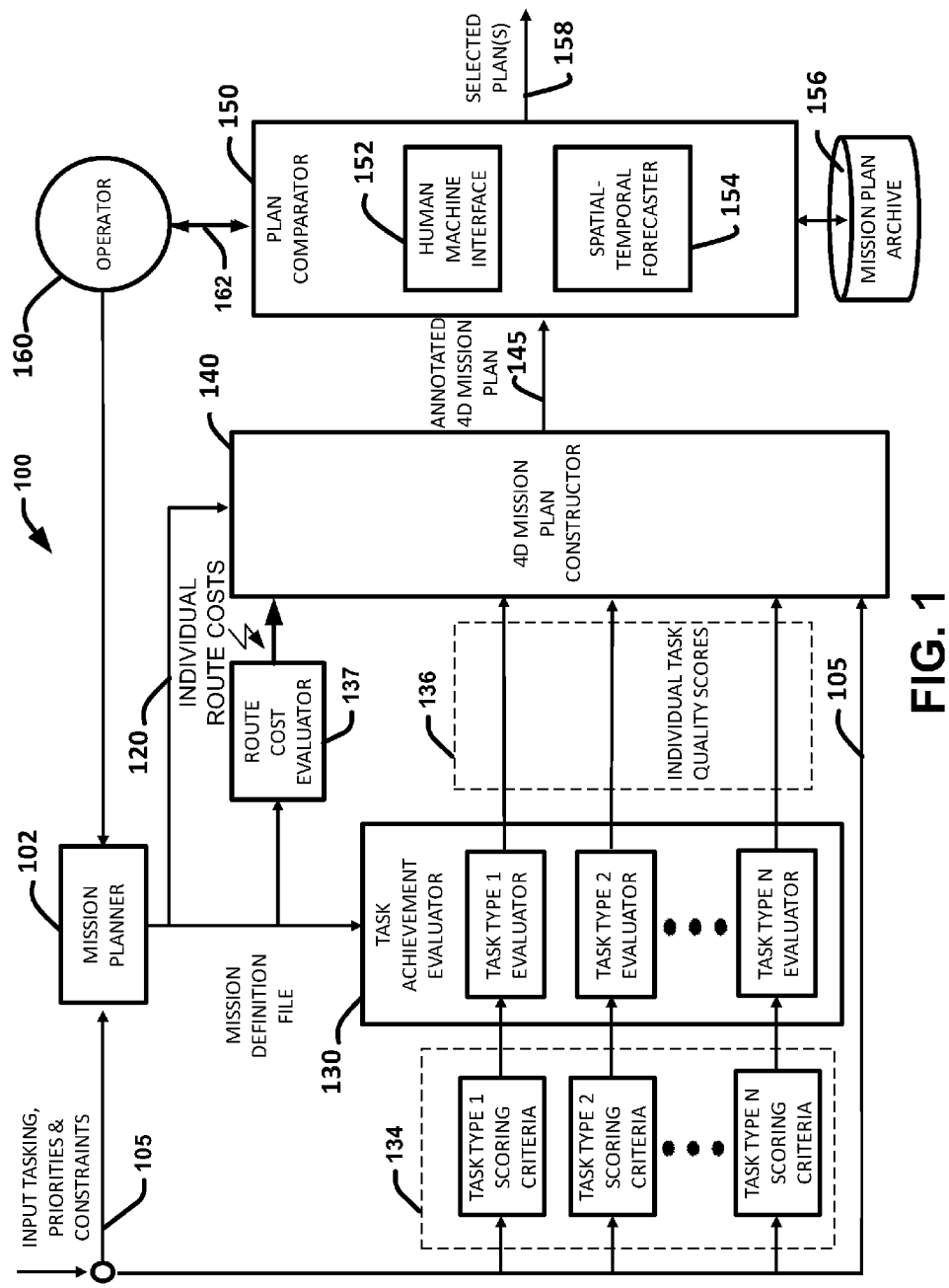
FIG. 1 illustrates a block diagram of an example system to dynamically evaluate mission plans for manned or unmanned vehicles independent of vehicle domain type over selected current or future time periods.

This disclosure relates to a system and method to dynamically evaluate mission plans for both manned and unmanned vehicles over selected current or future time periods. The system and method described herein are independent of any one mission planning system and any one vehicle domain type and can be used in all phases of a mission including pre-mission planning, mission execution, and post-mission analysis. An analyzer and interface are provided to quantitatively assess alternative mission plans based on selected time intervals and mission input criteria to enable real time selection of the most suitable plan by an operator. Various mission planning inputs are processed by external mission planning systems to determine a three-dimensional (3D) (latitude, longitude, altitude) mission plan for evaluation by the operator.

The operator can also apply decision criteria to generate a 4D (e.g., time element added) collection of mission plans by causing the route to branch, changing the evaluation criteria, or varying any of a number of other inputs. The operator then applies their respective experience and judgment to select the best option or engage in additional "what-if" analysis to improve the evaluated plans. Historically, the operator has taken the single route output of the mission planner and further evaluated it to determine the "best" solution manually. This automated analytical approach however allows an evaluation engine to perform real time alternative plan analysis in lieu of manual operator analysis. This provides the operator with real time information (both current and future projected time) to make a more informed (quantitative) decision regarding what plan is most suitable amongst a larger collection of plan options.

At least one external mission planner can be provided that processes one or more mission plan inputs and generates one or more mission definition files (MDF's) that include mission data that describes one or more alternate mission plans for one or more vehicles. This includes a plurality of evaluation engines that evaluate planned route costs and mission task achievements against defined scoring criteria. Costs can be defined as time spent, fuel consumed, amounts of other consumables used, or threats to vehicle safety. Task achievements numerically score how well the plan accomplishes a task compared to defined success criteria. A mission plan evaluator reviews each plan's costs and task achievement scores, and makes annotations indicating how well each segment of the plan performs. A plan comparator assists a human operator by providing a Human Machine Interface (HMI) enabling rapid plan review and access to a spatial-temporal forecaster. The spatial-temporal forecaster projects the state of the environment and the vehicles to a future time specified by the operator. The output of the forecaster represents an estimate of the state of the environment and vehicle state at the specified future point and is presented to the operator via the HMI.

The HMI presents an interactive visualization to the operator permitting observation of the environment and vehicles enabling a quick assessment of a proposed mission plan and alternatives. Based on the operator's judgment, a mission plan or one of its alternatives may be selected for use. Alternatively, the operator may decide to adjust input parameters to a mission planning system and request the generation of another plan alternative for evaluation. The plan comparator enables the operator to store multiple plans to an archival media such as a hard drive or optical drive for example. Stored plans may be retrieved for comparison and analysis with the current plan under development. When a final plan has been selected, the operator may save it to the plan archive for future execution or issue it directly to a vehicle for immediate execution. The final plan consists of at least one primary, or baseline, plan and zero or more optional contingency plans for selected points along the planned route.

In one aspect, the system can be used during pre-mission planning to select a final plan from a set of alternatives for future execution. The system can be used during mission execution to select a modification to the current plan for immediate execution based on changes to the vehicle state or the operating environment. In another aspect, the system can be used to perform post-mission analysis of an as-executed mission comparing it to the planned mission and can also be used to evaluate multiple plans for a single vehicle. In another aspect, the system can be used to evaluate multiple plans for multiple vehicles of the same domain type. The system can also be used to evaluate multiple plans for multiple vehicles of different domain types. Further, the system can be used to analyze plans in conjunction with a modeling and simulation capability to determine the effectiveness of experimental techniques, tactics, and procedures.

The operator interface can be adjusted for the evaluation of a single mission over a selected time period while also providing the option to review scored alternative plans that best suits selected criteria (e.g., which sensor payloads to deploy). The interface represents an improvement in the presentation of evaluation criteria of a mission plan in that it clearly presents the contributions of each resource (e.g., payload sensor) of the mission to the overall plan score, which is based on a set of operator selected criteria. A time slider within the interface allows the user to adjust the time window for the plan evaluation (present and/or future projection of resources). Since high-fidelity models of the vehicle, environment, threats, and tasks, are available, these models can be projected into the future based on the current vehicle state. Each major mission input (e.g., sensor payload) that the operator considers important to the evaluation of the mission appears on the evaluation interface screen with colored bars representing the time-based utilization of that input, for example. Beyond single plan evaluation, the interface can present multiple alternative plans to the operator with each plan having a score to indicate its suitability to the operator based on selected mission input criteria.

In one aspect, 4D data structures can be provided to assist the evaluation process. The data structures enable rapid construction of visualizations for current or future mission plans for vehicles as they occur over time. Visualizations can be generated in present real time and/or projected into the future for each of the primary plans and alternative plans for one or more vehicles. The data structures include a route field to describe at least one primary path and zero or more optional alternative paths for a vehicle (or vehicles). The route field describes the three-dimensional spatial capability of the vehicle that includes at least one of a latitude, a longitude, and an altitude parameter of the vehicle at defined waypoints along the primary or alternative paths. Alternative paths can represent alternative decision points along a mission that may be chosen depending on how events unfold. Alternative paths can also represent contingency plans to be executed in the event of a vehicle subsystem failure during the mission. The behavior field of the 4D data structure describes vehicle activities such as sensor or payload task execution, or other activities of other mission subsystems that can also be updated in real time and/or projected into the future. The data structure also includes a time field that describes a starting time or a duration for the primary and/or alternative mission plans.

The system produces visualizations of the primary and alternative mission plans via a Human Machine Interface (HMI) which can include a Graphical User Interface (GUI). Also, data (e.g., contingency or time data) within the 4D data structures for the respective plans can be updated in real time and/or projected into the future via a spatial-temporal forecaster. The HMI provides an output visualization of current and future states of a mission for at least one vehicle. The HMI can also visualize swarms of vehicles of disparate types as well as manned platforms and Manned and Unmanned Teams (MUMT) of vehicles. This enables planning, control, and analysis of swarms of disparate assets from a single HMI. A time selector provides command input to the HMI to specify a current time or a future time for the visualization of the current and future states of the mission including projections of the primary and/or alternative plans. The time selector can be controlled from substantially any operator input such as a time slider operated from a mouse, voice command, a hand or finger gesture, or a retinal scan command, for example.

The spatial-temporal forecaster receives data feeds from one or more inputs to determine a current world state of the mission. The data feeds can be collected from source inputs such as weather inputs, threat detection devices, sensors, communications modules, and so forth. The spatial-temporal forecaster employs the current world state of the mission and generates predictions of the current and future states of the mission for the HMI/GUI to visualize based on the current time or the future time specified by the time selector. For example, if present time is specified, current real time operations and status for a vehicle or swarm, consisting of heterogeneous manned and unmanned platforms, can be displayed. If the time selector specifies a future time, then the real time current environment can be projected into the future to allow the operator to analyze alternative scenarios that may occur in the future of the primary and/or contingency plans. Although many of the applications described herein can be applied to military and defense applications, the systems and methods described herein can also be applied to commercial automated vehicle planning applications such as unmanned package delivery in any domain (e.g., air, ground, sea surface), for example.

FIG. 1 illustrates an example system 100 to dynamically evaluate mission plans for manned and unmanned vehicles over selected current or future time periods. As used herein, the term unmanned vehicles can include unmanned vehicles of different domain types such as unmanned ground vehicles (UGV), unmanned underwater vehicles (UUV), unmanned surface vehicles (USV), unmanned aerial vehicles (UAV), and unmanned space vehicles. Also, the term vehicle can include both manned and unmanned vehicles of different domain types. Also, the term 4D refers to a data structure or configuration where both three dimensional position coordinates and with time accounted for as an additional dimension (e.g., $4^{th}$ dimension) for present and/or future visualizations generated in the system. Also, the systems and components described herein can be executed as computer readable instructions via one or more processors that read the respective instructions from a non-transitory computer readable medium.

The system 100 employs at least one external mission planner 102 that processes one or more mission plan inputs 105 and generates a mission definition file (MDF) 120 that includes mission data that describes one or more tasks and routes for one or more vehicles. As shown, the mission plan inputs 105 can also include task priorities and constraints. The system 100 includes a task achievement evaluator 130 that employs a plurality of evaluation engines, shown as task type evaluator 1 though N, where N is a positive integer, to evaluate each planned task contained in the MDF with respect to its respective task type scoring criteria 134 to generate individual task quality scores 136 representing an expectation of how well the planned task will be executed. Task type scoring criteria 134 are defined generically for each type of task planned and may be further constrained by optional inputs accompanying the tasking 105. For example, the general task type scoring criteria 134 for an image collection task may include items such as image target location and a required image quality whereas the general task type scoring criteria for an area search task may include a time of arrival, search duration, and geographical area within which to search.

For a specific image collection task, for example, the specific criteria 134 can specify the latitude, longitude, and elevation of the desired imaging target and a NIIRS 7 (National Imagery Interpretability Rating Scale level 7) as the image quality requirement. In addition, a route cost evaluator 137 evaluates the cost of each route 138 contained in the MDF 120. Route costs can be defined as time spent, fuel consumed, amounts of other consumables used, or threats to vehicle safety, for example.

The system 100 also includes a 4D mission plan constructor 140 that constructs a 4D data structure 145 making time an explicit parameter in combination with; the input mission plan 120; individual route costs 138; individual task quality scores 136; and the original input tasking, task priorities, and constraints 105. The 4D mission plan constructor 140 also reviews and annotates the 4D mission plan identifying portions of the plan that may need operator attention. This process is performed for at least the primary mission plan and all optional plan alternatives contained within the MDF 120. An annotated 4D mission plan 145 is output by the constructor 140 use by a plan comparator 150.

The data structures 145 can be expressed as a multi-dimensional tuple (e.g., What, <Behavior, When>) and configured as a graph. The "What" argument of the data structure 145 provides the labeled route and uniquely identifies it (e.g., primary route, contingency route, optional branch, and so forth). The "Behavior" argument provides the 3D spatial capability (e.g., <latitude, longitude, altitude>, heading, speed, fuel remaining) and the "When" argument provides the temporal capability (e.g., start time, time of arrival, and/or time tolerance (+/−minute window)). The data structure 145 and generated visualizations described herein empowers operators to conduct "What-If" scenarios of multiple assets across multiple routes by significantly reducing the burden of complexity for the operator. Effectively, this capability enables operators to rapidly conduct visual tradeoffs for unmanned systems, manned systems, and manned-unmanned teams, for example. Each Behavior field is associated with a When field, expressed as a starting time and/or duration. Also, any path in the graph data structure for the visualization can be represented as a sorted linked list, for example, representing a primary unmanned vehicle route and any alternative routes. In one example, the 4D mission plan constructor 140 employs a sorted linked list to represent the primary route and the alternative route and to generate a fused visualization of the primary route and the alternative route on a human machine interface (HMI) 152 of the plan comparator 150.

The plan comparator 150 enables an operator 160 to directly compare 162 alternative mission plans 145 against each other, via the HMI 152, identifying poor performing segments of each plan that may need adjustment or selecting a specific plan option that is more desirable than the other options. For example, the quality of planned image collections may be better in one plan option than another. For multiple vehicles, the plan comparator 150 provides functions that identify areas of conflict between plans as well as opportunities for collaboration between vehicles. The HMI includes a Graphical User Interface (GUI) that provides interactive visualizations to the operator. These visualizations can be generated for current or future time periods specified by the operator via a time selector embedded in the GUI. A spatial-temporal forecaster 154 in the plan comparator 150 generates predictions of the current and future states of the mission for the GUI to visualize based on the current time or the future time specified by the time selector. The plan comparator 150 also stores the plans and plan segments into an archive 156 for later retrieval and reuse. If additional plan alternatives are desired, the operator 160 makes adjustments to the input parameters of the mission planner 102 requesting generation of additional plan options 120. The internal functions of the plan comparator 150 can be manual, semi-automated, or fully automated as needed. The output of the plan comparator 150 is a selected mission plan for a single vehicle, a set of selected plans for a single vehicle, or a set of selected plans for multiple vehicles shown at 158.

Figure 2:
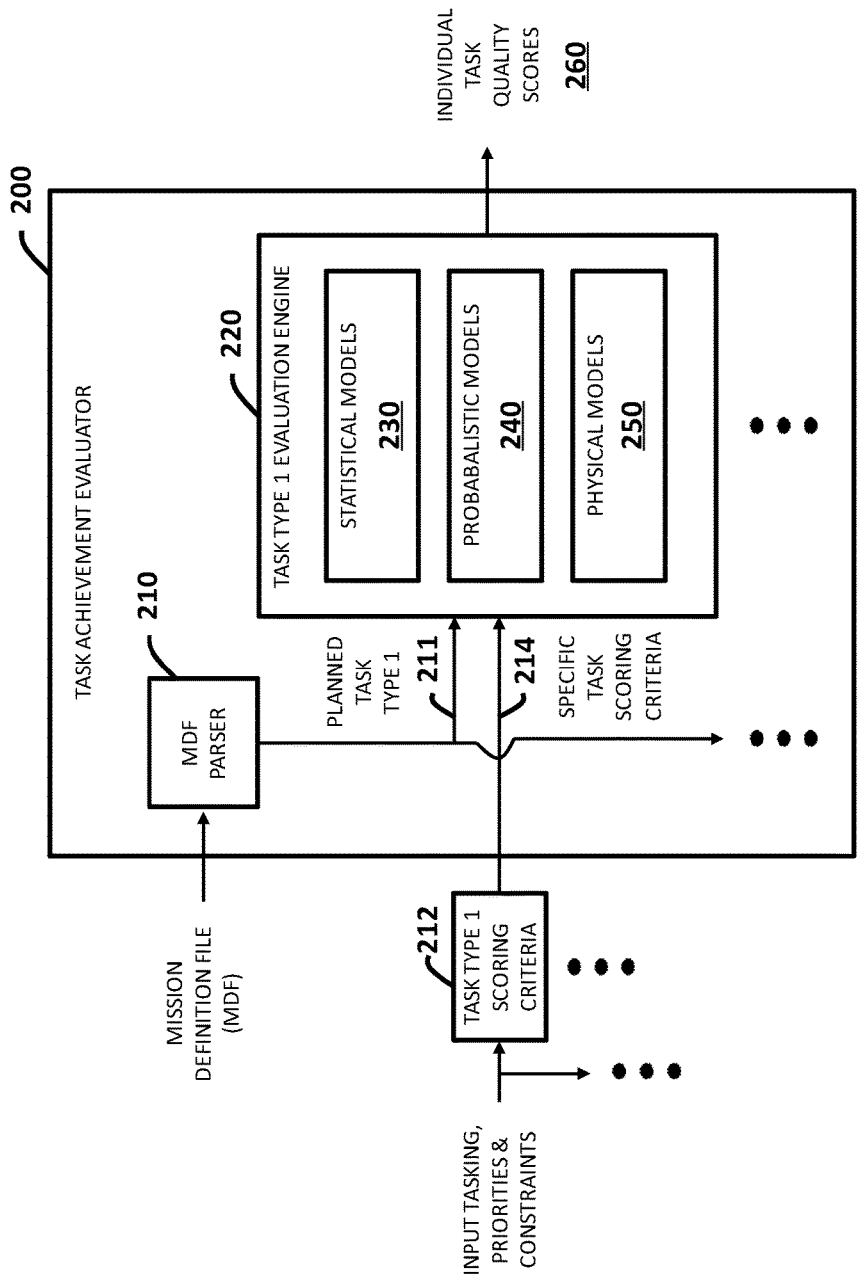
FIG. 2 illustrates an example of an evaluation engine for processing individual task achievement quality scores.

FIG. 2 illustrates example aspects of a task achievement evaluator 200. A Mission Data File (MDF) parser 210 parses MDF output from at least one mission planner into the individual tasks planned by the planner and provides each planned task type 211 to an evaluation engine 220 designed for its type. As previously described, input tasking and constraints are filtered by the task type scoring criteria 212 to generate a task scoring criteria specific to each individual task at 214. As shown, each task type evaluation engine 220 can include at least one of the following types of models: statistical models 230, probabilistic models 240, or physical models 250. Statistical models 230 can be used to represent one aspect of subsystem performance. For example, a specific imaging sensor may have a known statistical range versus image resolution performance curve. As such, a planned imaging task that positions the vehicle carrying the imaging sensor to within a certain range of the target should produce an image with a predictable resolution that can be compared to the resolution criteria specified for that task.

Probabilistic models 240 can also be used to represent another aspect of subsystem performance. For example, a certain type of target detection sensor may have target detection probabilities that vary with range to the target. As such, a planned task that positions the vehicle carrying the sensor to within a certain range of the target should expect to have a certain detection probability that can be compared to the detection probability required for that task. Yet another aspect of subsystem performance can be represented using physical models 250. For example, a specific imaging sensor may have certain physical limits on its field of view restricting the orientation of the vehicle (e.g., roll, pitch, and yaw angles) to be within certain limits with respect to the location of the target in order for the imaging sensor to be able to capture the target in its field of view determining if the task is physically possible to perform. After the evaluation engine 220 processes the planned task with each of its internal models, a quality score can be assigned to the planed task at 260. The quality scores are monotonic, where a higher score is better than a lower one, but are not normalized as it is not logical to compare achievement of tasks of different types. That is the purpose of task priorities which are provided along with the tasking request and any associated constraints.

Figure 3:
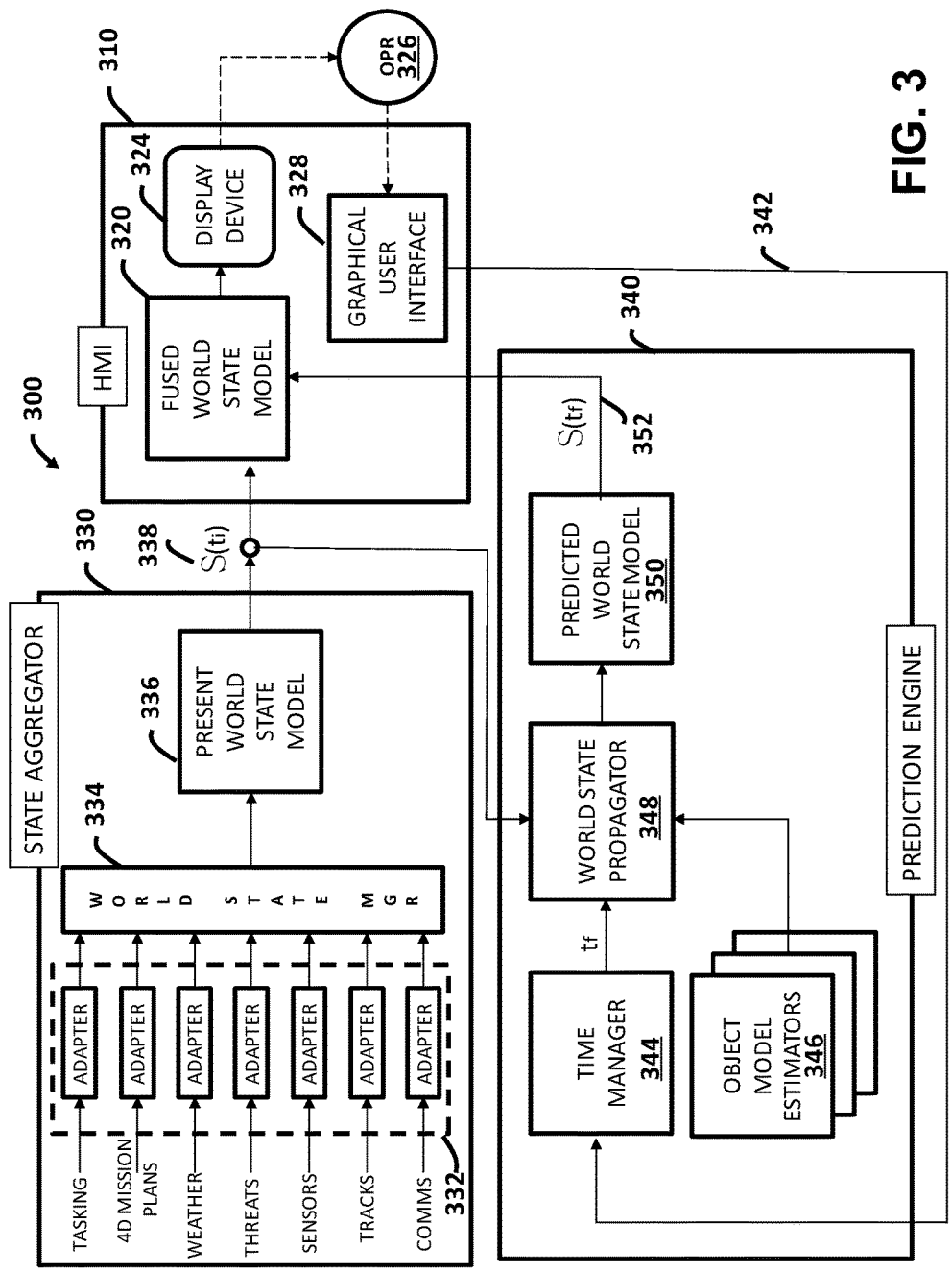
FIG. 3 illustrates a schematic diagram of an example system to provide spatial and temporal forecasting for predictive situation awareness of manned or unmanned vehicles using temporal data structures.

FIG. 3 illustrates a schematic diagram of an example system 300 to provide spatial and temporal forecasting for predictive situation awareness of vehicles under control of the system. The system 300 provides a more detailed aspect to the plan comparator of system 100 described above. The spatial-temporal forecaster system 300 consists of three main components: a Human Machine Interface (HMI) 310; a state aggregator 330; and a prediction engine 340.

The state aggregator 330 includes real-time data feeds that constitute the operating environment and are received via adapter modules 332 which are processed via the world state manager 334. The data feeds include 4D mission plans and their updates constructed in system 100 as described above. It is generally always on and is processing in real time.

A tasking data feed originates external to the system in various formats and consists of actions to perform by the vehicles under control of the system. These actions may include Intelligence Surveillance and Reconnaissance (ISR) collections, strike (both kinetic and electronic), communications relay, and the delivery of a payload such as fuel or supplies. Tasking can have constraints that may include a time window within which the action must take place; a location where the action must be performed; and detailed geometric constraints that may include azimuth, elevation, and velocity with respect to the tasking, for example.

A weather data feed originates external to the system in various formats and consists of information pertaining to winds, currents, cloud coverage, temperature, humidity, and precipitation. Weather feeds include both current measurements and forecasted conditions.

A threats data feed originates external to the system in various formats and includes threat information (e.g., type of threat, location, and range of threat effectiveness). Threats may also include environmental obstacles such as terrain, bodies of water, icebergs, and cultural obstacles such as power lines, buildings, and towers.

A tracks data feed originates external to the system in various formats and includes track information (e.g., entity type, hostile/friendly, location, velocity, orientation).

A sensors data feed is per payload type for each asset and consists of data for field of view and field of regard data on position and orientation of the sensor.

A COMMS data feed provides they type of communications asset available and its current and planned footprint over time.

Because each of the data feeds delineated above has multiple formats and can change independently of one another, adapters 332 have been created to mediate the various data types to an internal standardized data model managed by the world state manager 334. The world state manager 334 has the responsibility to aggregate the disparate data feeds into a single internal representation and at a single point in time as well as store and manage the internal present world state data model 336. By extension, other inputs and data feeds may also be aggregated into the present world state data model as needed through additional adapters 332.

This present world state model 336 is updated in real time and, at a minimum, is updated at a 1 Hz rate, for example. The present world state snapshot 338 is made available to the HMI's fusion and rendering pipeline component 320 which automatically renders the state onto a physical display device for the operator 326 to view. The present world state snapshot 338 is also provided to the prediction engine 340 for propagation into some future time t(f) specified by the operator.

As noted above, the HMI 310 includes the world state fusion & rendering pipeline 320 which is an event driven component that receives world state updates or changes made by the state aggregator 330 to the present world state 336. It also has the responsibility of fusing the current world state with future world state generated by the prediction engine 340 and rendering the resultant fused information onto the physical display device 324 for the operator 326 to view. Graphical input tools 328 houses graphical components that take inputs from the operator 326. A notional example of an input tool is a timeline slider. This input component displays current time, which is always moving forward, and a future time, which is calculated by an offset that is determined by the operator through sliding a marker along the timeline, in one example. When the operator 326 requests a projection of the world state by method of a graphical input tool 328, the present world state 338 and the offset time are passed into the prediction engine 340 which responds with a projection of the present world state 336 into the specified future point in time 352 S(t(f)) where S is the project state at future time t(f).

The prediction engine 340 includes a time manager 344 that is the master time manager for all entities in the world state model. It maintains a master wall clock and a real-time clock for each vehicle and environmental entity of interest. When it receives an offset time instance, it calculates a future clock instance by adding the real-time (current time) to the offset time for each platform or entity of interest. Since real time consistently moves forward, the time manager 344 has the added responsibility of determining how long the projected state is valid for. After the valid time period has expired, the time manager 344 notifies the system that the projected future world state is no longer valid and that a new projection is required.

One or more object model estimators (or predictors) 346 can be provided as a plug-in framework for creating, loading, and managing behavioral models. These models have a one to one correspondence to the data feeds coming into the state aggregator 330. Each object model estimator 346 includes methods and constraints specific to its associated data feed for projecting that particular data feed into the future. Such methods may include a family of prediction and interpolation algorithms that are appropriate for each respective object behavioral model. The prediction algorithms can include, but are not limited to, Kalman filters, Markov filters, Particle filters, Runga-Kutta, Predictor-Corrector, and so forth.

A world state propagator 348 processes an offset time, current state, and the appropriate object model estimators, and propagates them from the present state to a specified future state. The world state propagator 348 conducts this action for each object model. Upon completion of all the models, the predicted world state is aggregated into a single model at 350 and sent to the world state fusion & rendering pipeline 320 for display at 324.

Figure 4:
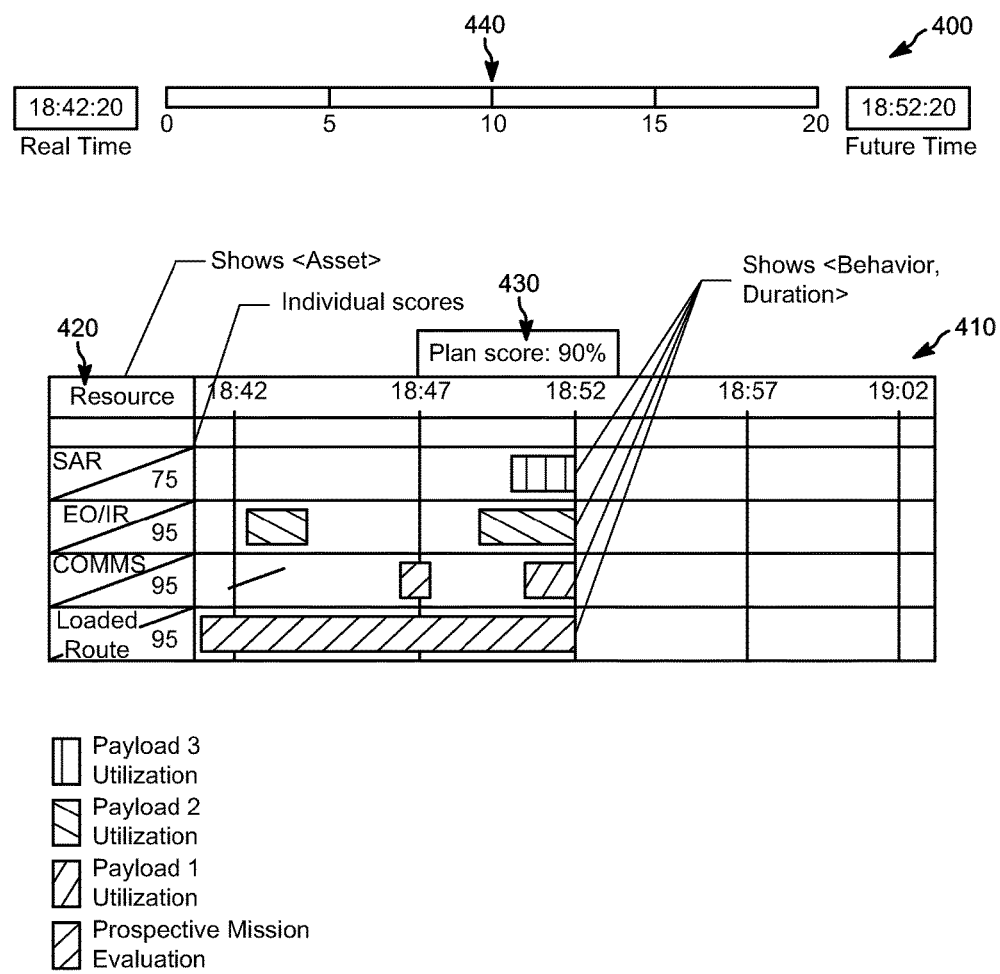
FIG. 4 illustrates an example visualization and interface illustrating a generated mission plan evaluation chart that shows an evaluation for a single mission over a selected time period.

FIG. 4 illustrates an example visualization and interface 400 illustrating a generated mission plan evaluation chart 410 that shows an evaluation for a single mission over a selected time period. The interface 400 shows an automated evaluation of a single mission over a selected time period. This interface 400 represents an improvement in the presentation of evaluation criteria of a mission plan in that it presents the contributions of each component of the mission shown as resources 420 to an overall plan score 430 which is based on a set of operator selected elements. In this example, the operator selected elements or resources 420 are a synthetic aperture radar (SAR), an elctro/optic infrared sensor (EO/IR), a Comms feed representing satellite communications ability with the unmanned vehicle, and the loaded route itself for the unmanned vehicle, for example. Each resource has an individual score assigned that can be determined as previously described.

A time slider at the top of the interface 400 allows the user to adjust the time window for the evaluation. Since high-fidelity models of the vehicle, environment, Threats, and Tasks, and so forth are available, these models can be projected into the future based on the current state. Each major element (e.g. SAR payload) that the operator considers important to the evaluation of the mission appears on the evaluation screen with colored bars, for example, representing the time-based utilization of that element. As shown, when a bar is present during a given time period, that indicates that its behavior for the duration of the bar is to be in gathering mode (or deployment mode if other type asset involved). In this example, since the time slider 440 is moved ahead to the ten minute mark, the behavior of each asset is evaluated from the present time to ten minutes in the future with gathering behavior represented as a bar and when the resource is non-functional, no bar is shown on the chart 410.

Figure 5:
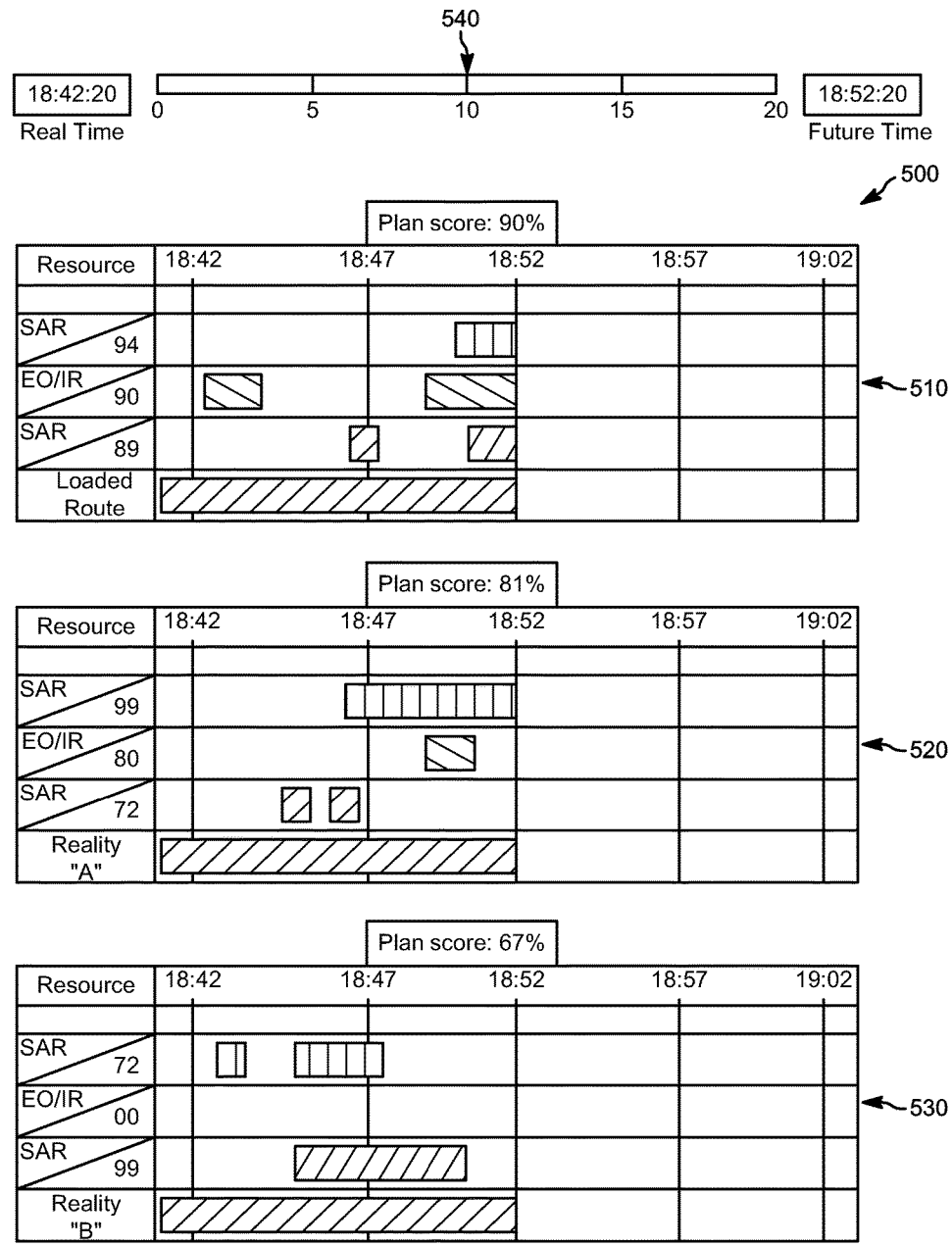
FIG. 5 illustrates an example visualization and interface illustrating generated mission plan evaluation charts that shows evaluations and comparisons for multiple mission evaluations for multiple route options over a selected time period.

FIG. 5 illustrates an example visualization and interface 500 illustrating generated mission plan evaluation charts 510, 520, and 530 that show evaluations and comparisons for multiple mission evaluations for multiple route options over a selected time period. In this example, the time interval over which the mission options 510 through 530 are evaluated starting at the present time (which could be prior to launch or during a mission) can be set via time slider 540. A detailed evaluation interface for each mission option is generated at 510, 520, and 530. The resource element usage scoring during the evaluated time period for each route option is provided. Also, the evaluated plan score over the evaluation time interval for each route option is provided. The individual resources are evaluated and their scores displayed along with an overall evaluation. If the operator decides to set the priority for a particular resource, this presentation provides a clear assessment of utilization and anticipated benefit of use for the respective resource.

Figure 6:
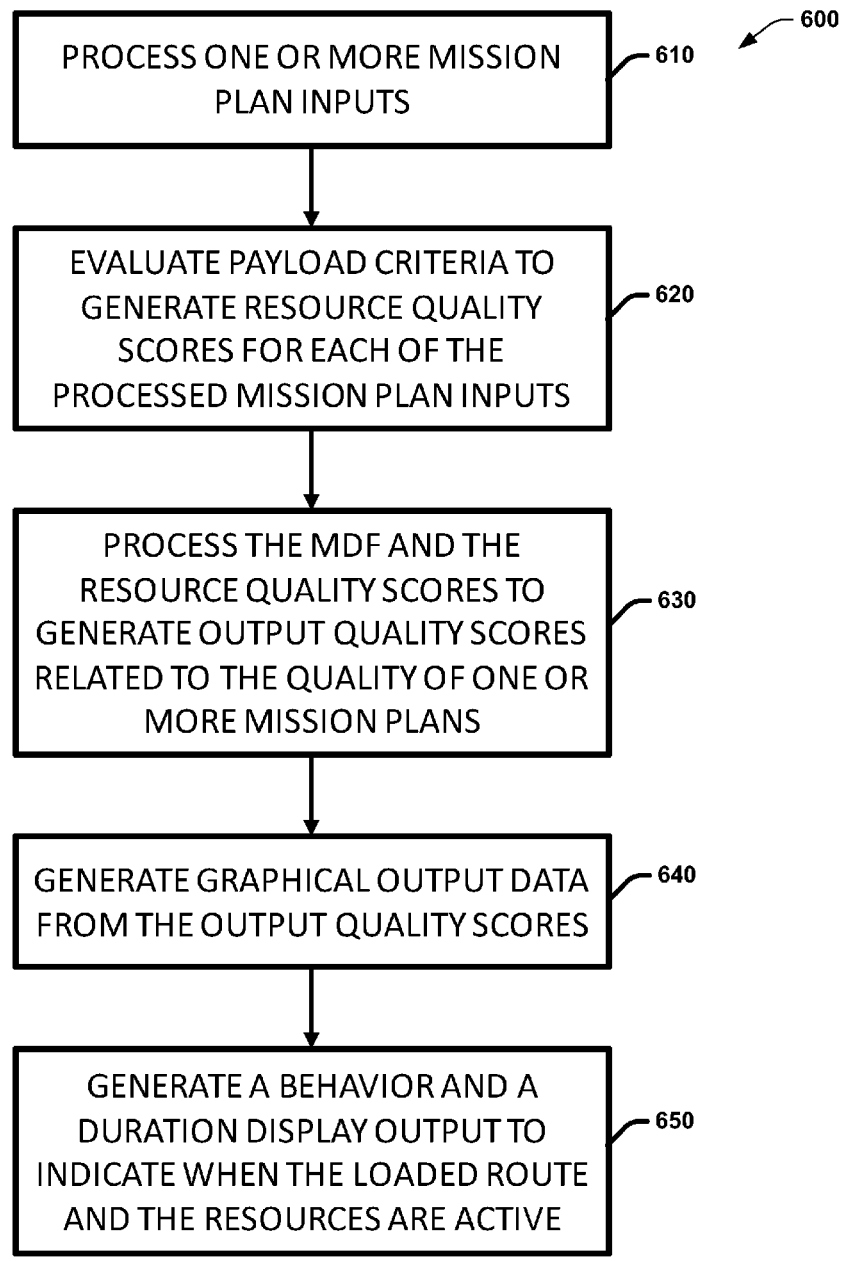
FIG. 6 illustrates an example method to dynamically evaluate mission plans for unmanned vehicles over selected current or future time periods.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 6 illustrates an example method 600 to dynamically evaluate mission plans for unmanned vehicles over selected current or future time periods. At 610, the method 600 includes processing one or more mission plan inputs to generate a mission definition file (MDF) that includes mission data that describes one or more routes for one or more vehicles (e.g., via mission planner 110 of FIG. 1). At 620, the method 600 includes evaluating payload criteria to generate resource quality scores for each of the processed mission plan inputs (e.g., via evaluation engines 1-N of FIG. 1). The resource quality scores relate to the payload execution ability over time of resources that drive the mission plan inputs. At 630, the method 600 includes processing the MDF and the resource quality scores to generate output quality scores related to the quality of one or more mission plans (e.g., via mission plan evaluator 136 of FIG. 1). At 640, the method 600 includes generating graphical output data from the output quality scores (e.g., via 4D mission plan constructor 140 and plan comparator 150 of FIG. 1). The graphical output data can be configured as a mission plan evaluation chart, for example. The mission plan evaluation chart provides the plan score, the normalized resource scores, and the loaded route score, for example. At 650, the method 600 includes generating a behavior and a duration display output to indicate when the planned resources are active and the amount of time that the mission plan is active and when data can be collected by the resources.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
   a memory to store computer-executable components; and
   a processor to execute instructions corresponding to the computer-executable components from the memory, the computer-executable components comprising:
      at least one mission planner that processes one or more mission plan inputs and generates a mission definition file (MDF) that includes mission data that describes one or more mission plans for one or more manned or unmanned vehicles;
      a task achievement evaluator that evaluates task criteria to generate individual task quality scores for each of the mission plan input tasks processed by the at least one mission planner, the task quality scores representing an expectation of how the planned task is to be executed;
      a mission plan constructor to process the MDF from the at least one mission planner and the task quality scores from the task achievement evaluator to generate a plan score for one or more annotated mission plans; and
      a plan comparator to process the one or more annotated mission plans, the plan comparator generating graphical output data from the output quality scores generated by the task achievement evaluator, the graphical output data configured as a mission plan evaluation chart, the mission plan evaluation chart providing the plan score generated by the mission plan constructor, the plan comparator comprising:
         a spatial temporal forecaster to project planned mission states to a specified future point in time; and
         a human machine interface (HMI) for visualizing mission plans and projected future states of the mission plans, the HMI comprising a graphical user interface (GUI) to display the mission plan evaluation chart generated by the plan comparator, the GUI providing a visualization of the tasks and constraints that drive the mission plan inputs, a visualization of the task achievement quality scores associated with data-collection resources associated with the one or more vehicles, a visualization of a primary mission plan among the one or more mission plans, and a visualization of the plan score,
         wherein the plan comparator generates a behavior and a duration display output to the GUI to indicate when a loaded mission plan is active and the amount of time that the loaded mission plan is active and when data can be collected by the resources.

2. The system of claim 1, wherein the behavior and the duration is stored in a data structure comprising:
   a route field to describe a planned route for one of the one or more vehicles;
   a behavior field to describe three-dimensional spatial capability of the vehicle and its resource capability that includes at least one of a latitude, a longitude, and/or an altitude parameter for the mission plan of the vehicle; and
   a when field that describes a starting time or a duration for the mission plan of the vehicle and a starting time or a duration for deployment of the resources.

3. The system of claim 2, further comprising a time selector to adjust the when field of the data structure to specify time projections of the mission plan and deployment of resources over time.

4. The system of claim 2, further comprising a state aggregator to process input data feeds to update the behavior field of the data structure in real time, the data feeds include at least one of a tasking feed, a mission plan feed, a weather feed, a threat feed, a sensor feed, a tracks feed, and/or a communications feed.

5. The system of claim 4, further comprising a prediction engine to project the data feeds from the state aggregator into a future visualization of the mission plan, a future visualization of the resources, and a future visualization of at least one alternative plan for the vehicle.

6. The system of claim 1, wherein the plan comparator generates graphical output data for multiple mission plan evaluation charts having output quality scores generated by the task achievement evaluator for each of the multiple mission plan evaluation charts, each of the multiple mission plan evaluation charts relating to an alternative plan for one of the one or more vehicles.

7. The system of claim 1, wherein payload criteria evaluated by the task achievement evaluator includes sensor availability, a number of sensor scans, a resolution of the sensor scans, communications capability of one of the one or more vehicles, and asset deployment capability of the vehicle.

8. The system of claim 1, wherein the task achievement evaluator includes at least one evaluation engine that includes a processor to process at least one of a statistical model to determine statistical data relating to future conditions encountered by one of the one or more vehicles, a probabilistic model to determine probabilities for asset deployment of the vehicle, and/or a physical model to determine if the planned tasks are within physical constraints of the vehicle and its resources.

9. The system of claim 1, wherein mission constraints analyzed by a route cost evaluator for a plan under evaluation that includes at least one of available fuel for one of the one or more vehicles, wind speeds and direction vector, weather patterns in the mission area of the vehicle, and/or threats to vehicle safety in the mission area.

10. A non-transitory computer readable medium having computer executable components stored thereon, the computer executable components comprising:

at least one mission planner that processes one or more mission plan inputs and generates a mission definition file (MDF) that includes mission data that describes one or more mission plans for one or more manned or unmanned vehicles;

a task achievement evaluator having at least one evaluation engine that evaluates task criteria to generate individual task quality scores for each of the mission plan input tasks processed by the at least one mission planner, the task quality scores represent an expectation of how the planned task is to be executed;

a mission plan constructor to process the MDF from the at least one mission planner and the task quality scores from the task achievement evaluator to generate a plan score for one or more annotated mission plans; and a plan comparator to process the one or more annotated mission plans, the plan comparator generates graphical output data from the output quality scores generated by the task achievement evaluator, the graphical output data configured as a mission plan evaluation chart, the mission plan evaluation chart providing the plan score generated by the mission plan constructor, the plan comparator comprising:

a spatial temporal forecaster to project planned mission states to a specified future point in time; and a human machine interface (HMI) for visualizing mission plans and projected future states of the mission plans, the HMI comprising a graphical user interface (GUI) to display the mission plan evaluation chart generated by the plan comparator, the GUI providing a visualization of the tasks and constraints that drive the mission plan inputs, a visualization of the task achievement quality scores associated with data-collection resources associated with the one or more vehicles, a visualization of the primary mission plan, and a visualization of the plan score;

wherein the plan comparator generates a behavior and a duration display output to the GUI to indicate when the loaded mission plan is active and the amount of time that the loaded mission plan is active and when data can be collected by the available resources.

11. The computer readable medium of claim 10, wherein the plan comparator generates graphical output data for multiple mission plan evaluation charts having output quality scores generated by the task achievement evaluator for each of the multiple mission plan evaluation charts, and wherein each of the multiple mission plan evaluation charts relates to an alternative plan for one of the one or more vehicles.

12. The computer readable medium of claim 10, wherein payload criteria evaluated by the task achievement evaluator includes sensor availability, a number of sensor scans, a resolution of the sensor scans, communications capability of one of the one or more vehicles, and asset deployment capability of the vehicle.

13. The computer readable medium of claim 10, wherein the at least one evaluation engine includes a processor to process at least one of a statistical model to determine statistical data relating to future conditions encountered by one of the one or more vehicles, a probabilistic model to determine probabilities for asset deployment of the vehicle, and/or a physical model to determine if the planned tasks are within physical constraints of the vehicle and its resources.

14. A computer-implemented method, comprising:
processing one or more mission plan inputs to generate a mission definition file (MDF) that includes mission data that describes one or more mission plans for one or more manned or unmanned vehicles;

evaluating payload criteria to generate resource quality scores for each of the processed mission plan inputs, the resource quality scores relating to the payload execution ability over time of resources that drive the mission plan inputs;

processing the MDF and the resource quality scores to generate output quality scores related to the quality of one or more mission plans;

projecting planned mission states to a specified future point in time;

generating graphical output data from the output quality scores, the graphical output data being configured as a mission plan evaluation chart;

generating a behavior and a duration display output to indicate when a loaded route from the mission plans and associated resources are active and the amount of time that the loaded route is active and when data can be collected by the resources;

displaying, with a human machine interface (HMI) including a graphical user interface (GUI), visualized mission plans and projected future states of the mission plans, including the mission plan evaluation chart, the GUI providing visualization of data-collection resources associated with the one or more vehicles and constraints driving the mission plan inputs, visualization of the output quality scores, visualization of the resource quality scores, and a visualization of a primary mission plan among the one or more mission plans.

15. The computer-implemented method of claim 14, further comprising generating graphical output data for multiple mission plan evaluation charts where each of the multiple mission plan evaluation charts relate to an alternative plan for one of the one or more vehicles.

* * * * *